United States Patent [19]
Markström

[11] Patent Number: 6,085,633
[45] Date of Patent: Jul. 11, 2000

[54] STEERING GEAR DEVICE

[75] Inventor: Lars Markström, Göteborg, Sweden

[73] Assignee: AB Volvo, Sweden

[21] Appl. No.: 09/029,418

[22] PCT Filed: Aug. 28, 1996

[86] PCT No.: PCT/SE96/01056

§ 371 Date: Feb. 26, 1998

§ 102(e) Date: Feb. 26, 1998

[87] PCT Pub. No.: WO97/08036

PCT Pub. Date: Mar. 6, 1997

[30] Foreign Application Priority Data

Aug. 29, 1995 [SE] Sweden ................................ 9502989

[51] Int. Cl.[7] .................................................. B62D 5/06
[52] U.S. Cl. ............................................. 91/368; 92/136
[58] Field of Search ..................................... 91/23, 358 R, 91/368, 382, 392, 397, 399; 92/136

[56] References Cited

U.S. PATENT DOCUMENTS

| | | | |
|---|---|---|---|
| 1,056,600 | 3/1913 | Spohrer | 91/399 X |
| 2,532,342 | 12/1950 | Sloane | 91/171 |
| 3,407,598 | 10/1968 | Yokota | 91/399 X |
| 4,354,422 | 10/1982 | Nishikawa et al. | 91/358 R |
| 4,770,205 | 9/1988 | Jones et al. | 91/397 X |
| 5,385,218 | 1/1995 | Migliori | 91/23 X |
| 5,839,527 | 11/1998 | Elser et al. | 91/399 X |

FOREIGN PATENT DOCUMENTS 24 08 265  9/1975  Germany.

*Primary Examiner*—John E. Ryznic
*Attorney, Agent, or Firm*—Lerner, David, Littenberg, Krumholz & Mentlik, LLP

[57] ABSTRACT

The invention relates to a device for modulation of servo pressure in a steering gear (1) comprising an input shaft (2) which is attached to a rack (4; 4'), a servo mechanism (9–17) for supply of power to the rack (4; 4') and comprising a box (8; 8) with a first channel (18, 20, 21) and a second channel (19) for the supply and return, respectively, of servo medium, and a connection channel (22; 29, 30) between the first and the second channel (18, 20, 21, 19). The invention further comprises means (28; 36) for detecting whether the rack (4; 4') is in a predetermined position, and a valve member (23; 31) for opening the connection channel (22; 29, 30) when said position is detected. The invention is characterized in that the valve member (23; 31) interacts with the rack (4; 4") and has its extension through the connection channel (22, 29, 30), and in that said means (28; 36) are constituted by a shape modification in the rack (4; 4') with which the valve member (23; 31) interacts when detecting said position, whereby the valve member (23; 31) is influenced to open and close, respectively, the connection channel (22; 29, 30). By means of the invention, an improved device for reduction of the load from the servo device, when the steering wheel has been turned to a predetermined position, is provided.

11 Claims, 3 Drawing Sheets

STEERING GEAR DEVICE

TECHNICAL FIELD

The present invention relates to a device for the reduction of servo pressure in steering gear, in accordance with the preamble of claim 1.

STATE OF THE ART

In connection with steering mechanisms for motor vehicles, servo mechanisms are often utilised in order to supply power to the steering mechanism when turning the steering wheel of the vehicle. A commonly occurring steering gear comprises an input shaft on which the steering wheel is arranged, whereby the shaft transfers the movements of the steering wheel to a pinion which in turn is connected to a rack. The movements of the rack are in turn transferred to the wheels of the vehicle. Such a known steering gear may be complemented by a servo mechanism which comprises a hydraulic cylinder with a piston which is arranged on the rack. The servo mechanism also comprises a servo pump and a valve assembly. When turning the steering wheel of the vehicle, hydraulic oil is fed to the cylinder by means of the valve assembly, whereby the piston and consequently also the rack is influenced in a direction corresponding to the turning direction of the steering wheel. In this manner, power is supplied to the rack when turning the steering wheel.

In the previously known device, the flow of hydraulic oil from the servo pump to the steering gear is always constant. When the servo function comes into force, the servo pressure increases since the flow through the steering gear is throttled by means of the above mentioned valve assembly. This is particularly disadvantageous when the steering gear reaches one of its end positions, e.g. when the steering wheel is turned to the left or the right end position and causes problems in the form of noise and vibrations. Furthermore, the engine of the vehicle is heavily loaded by the servo pump, which entails that the idling speed of the vehicle cannot always be kept constant. Finally, the hydraulic oil is heated up at an abnormal rate, which may cause damage to the servo pump.

A previously known device which aims at solving these problems is known from U.S. Pat. No. 4,354,422. The device comprises a pivoting cage which may be turned in relation to an input shaft which is connected to the steering wheel of the vehicle. The cage is connected to a valve which can be adjusted so that oil is supplied for the displacement of a rack when the input shaft is turned. When the rack reaches one of its end positions, the cage will be influenced by a cam member and be turned back to a neutral position, independent of the force on the input shaft. This entails that the valve returns to a neutral position so that a connection between an oil supply line and an oil tank is short-circuited. In this way, the power from the servo pump is reduced.

The construction of this previously known device is, however, rather complicated, which results in high manufacturing costs and may also cause problems. Furthermore, it cannot be utilised in connection with all types of conventional steering gears.

SUMMARY OF THE INVENTION

A main object of the present invention is to solve the above mentioned problems and to provide an improved device which reduces the load derived from a servo mechanism of a steering gear when the steering wheel has been turned to a predetermined position and which may be utilised in connection with conventional steering gear. This object is achieved by a device of the type mentioned in the introduction, the characterizing features of which are evident from the characterizing portion of claim 1.

Accordingly, the invention comprises a special valve member, abutting directly against the rack and extending through a connection channel between the supply and return lines for servo oil, and the rack is provided with a portion having a modified shape for interaction with the valve member, whereby the valve member in an effective way may be displaced so that the supply and the return lines are short-circuited when the rack is in a predetermined position. In this manner, a simple but yet effective valve construction is obtained which, moreover, may be integrated into a conventional servo system.

According to a preferred embodiment the valve member is made up of an essentially cylindrical rod or pin which slides with its bottom surface against the rack.

Preferably, the invention comprises a supply channel for servo-medium when the rack is influenced in one direction, and a further supply channel for servo-medium when the rack is displaced in the opposite direction. According to a particular embodiment, the above mention valve member is arranged to connect one of said supply channels with a return line for servo-oil, via a connection channel, when detecting said predetermined position of the rack.

DESCRIPTION OF THE DRAWINGS

The invention will be described in the following with reference to the attached drawings, in which.

PREFERRED EMBODIMENTS

Figure 1:
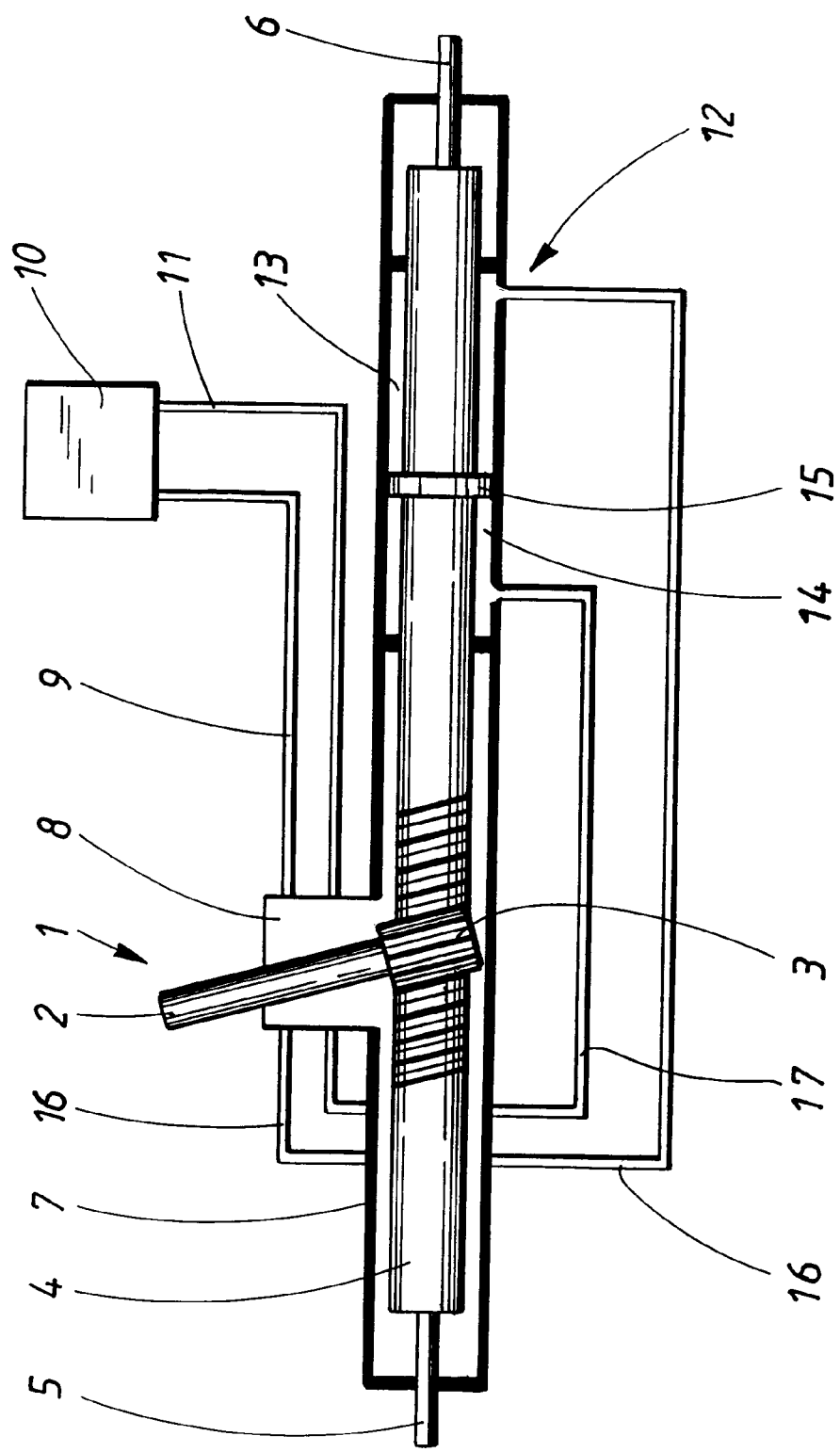
FIG. 1 is a schematic view of steering gear according to the present invention.

In FIG. 1, a device according to the present invention is shown in a schematic and somewhat simplified form. According to a preferred embodiment, the device is intended to be used in connection with steering gear 1 of an essentially conventional type, intended for use in a motor vehicle.

The steering gear 1 is of a rack type and comprises an input shaft 2 which is connected to a (not shown) steering wheel of the vehicle. The input shaft 2 is firmly attached to a pinion 3, which comprises teeth interacting with corresponding teeth on a rack 4. Two steering drag rods 5, 6 are arranged on the respective ends of the rack 4. The steering drag rods 5, 6 are fitted in a conventional way to the rack 4 via ball joints or the like and are intended to control the direction of the wheels. In this way, a torsional movement of the steering wheel may be transferred to the wheels of the vehicle via the input shaft 2, the pinion 3, the rack 4 and the steering drag rods 5, 6. The deflection of the wheels, i.e. the end positions of the steering wheel and the input shaft 2 are defined by (not shown) stops in the steering gear 1.

The rack 4 is built into a steering box 7 which in turn is incorporated with a valve box 8, the construction and function of which will be described in detail below. A supply line 9 for the supply of a servo medium, preferably oil, from a servo pump 10 is connected to the valve box 8. Furthermore, a return line 11 is provided which is connected between the valve box 8 and the servo pump 10 and which is intended for returning servo oil from the steering gear 1 to the servo pump 10. The servo pump 10 is preferably driven by means of a (not shown) mechanical transmission from the engine of the vehicle, e.g. a V-belt.

Furthermore, the device comprises a hydraulic cylinder 12 which is formed between the rack 4 and the steering box 7. The cylinder 12 is divided into a first cylinder chamber 13 and a second cylinder chamber 14 by means of a piston 15 which is firmly arranged in the rack 4 and which seals against the inner walls of the cylinder 12 (i.e. the steering box 7). Furthermore, the valve box 8 is connected to the cylinder chambers 13, 14 by means of third line 16 and a fourth line 17.

When operating the device, the servo pump 10 is driven by the engine of the vehicle. Hereby, servo oil is fed from the servo pump 10 to the steering box 1 via the supply line 9. Within the valve box 8, in connection with the input shaft 2, there is located a valve baffle of a known type which is described in no greater detail. By means of this, servo oil at a high pressure may be directed to one of the cylinder chambers 13 and 14, respectively, via the third or fourth line 16 and 17, respectively, depending on in which direction the input shaft 2 is influenced with a certain torque. Depending on the torsional position of the input shaft 2, the valve baffle is adapted to be able to connect the supply line 9, the return line 11, the third line 16 and the fourth line 17 to each other so that the following functions can be achieved:

i) If the input shaft 2 is located in a neutral position (i.e. if it has not been turned in any direction) the supply line 9 is short-circuited by the return line 11.

ii) If the input shaft 2 is turned anticlockwise (seen from above), the supply line 9 is connected to the third line 16. Servo oil under high pressure is thereby fed to the first chamber 13. Consequently, the rack 4 is influenced to the left in FIG. 1. Furthermore, the fourth line 17 will come into contact with the return line 11 so that servo oil at a low pressure is fed from the second chamber 14 back to the servo pump 10.

iii) If the input shaft 2 is turned clockwise, the supply line 9 is connected to the fourth line 17. Servo oil under high pressure is thereby fed to the second chamber 14 so that the rack 4 is influenced to the right in FIG. 1. Furthermore, the third line 16 will come into contact with the return line 11 so that servo oil at low pressure is fed from the first chamber 13 back to the servo pump 10.

The above course of events is facilitated since the input shaft 2 is preferably provided with a (not shown) torsion bar of a previously known type. The torsion bar is in a known way attached to the input shaft 2 and the pinion 3 and permits that servo effect (in accordance with the above mentioned functions i), ii) and iii)) may be obtained as soon as a torque is applied to the input shaft 2 in one of the two directions. By means of the torsion bar, servo effect may thus be obtained even if the input shaft 2 is not turned.

Figure 2:
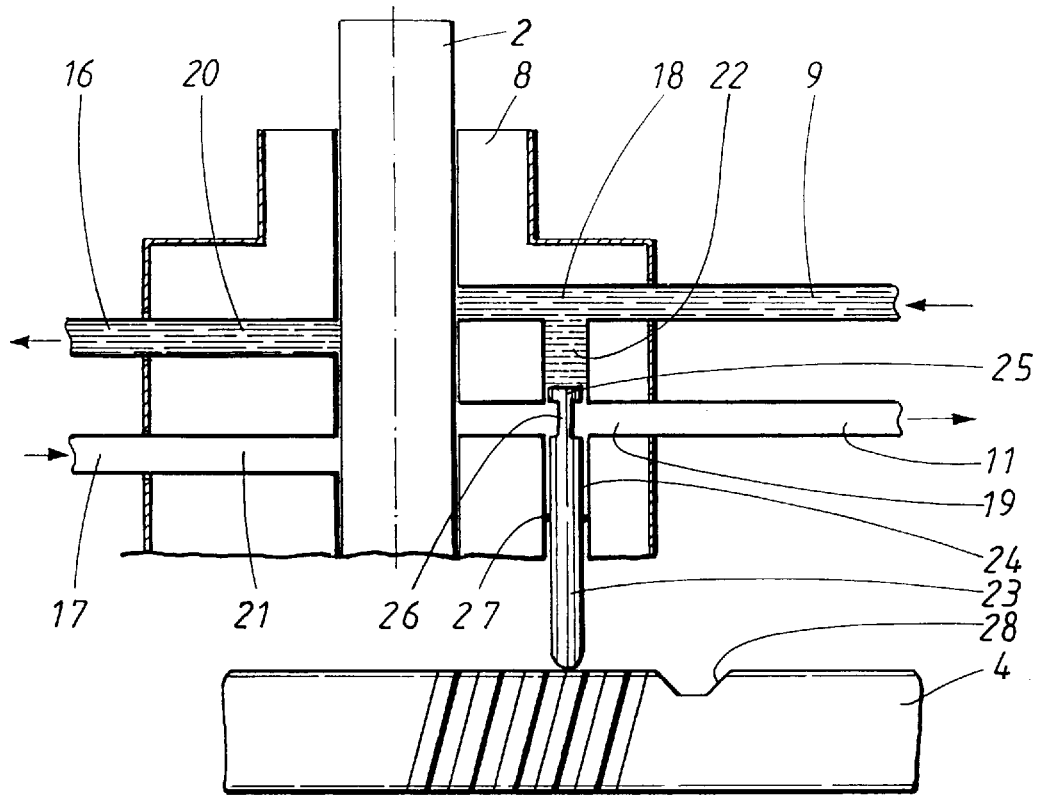
FIG. 2 is an enlarged, partially cut away, view which schematically shows the device according to the invention in a first position.

In FIG. 2, a partially cut away, principal view of the valve box 8 is shown. The drawing also shows a part of the input shaft 2 and the rack 4, and reproduces the invention in a state corresponding to the steering wheel being turned anticlockwise, i.e. in order to steer the vehicle to the left.

Hereby, servo oil is fed via the supply line 9 into a supply channel 18 in the valve box B. The servo oil is returned from the valve box 8 through the return line 11 via a return channel 19.

In the operational case in question, the servo oil is directed with the help of the above mentioned valve baffle to the third line 16 via a third channel 20 in the valve box 8. The servo oil is returned from the cylinder 12 (compare with FIG. 1) via the fourth line 17 and a fourth channel 21 in the valve box 8, and thereafter back to the return channel 19. In this way, a power addition is obtained, which affects the rack 4. In FIG. 2, servo oil under high pressure has been marked with hatched lines.

The supply channel 18 is connected to the return channel 19 by means of a connection channel 22. Furthermore, a valve member 23 in the form of an essentially cylindrical rod is arranged in the connection channel 22 and in a further channel portion 24 in the valve box 8. The channel portion 24 may constitute an extension of the connection channel 22 so that the valve member 23 may be displaced through the two channels 22 and 24.

The valve member 23 is preferably arranged essentially vertically so that its bottom surface abuts on the upper side of the rack 4. Furthermore, the valve member 23 has an upper portion 25 with dimensions which are slightly less than the dimensions of the connection channel 22. This entails that the upper portion 25 has a sealing function which in the operation condition in question prevents servo oil from leaking into the return channel 11. Moreover, the valve member 23 has a narrow middle portion 26 which permits the passage of servo oil through the return channel 19. The valve member 24 is preferably made of steel and has a rounded bottom surface which slides against the upper surface of the rack 4. In order to reduce the friction of the rack 4 against the valve member 23, the latter is preferably lubricated with grease. Furthermore, the valve member 23 is provided with a seal 27 by means of which the channel section 24 is sealed.

In accordance with the invention, the rack 4 comprises a shape modification, such as for instance a cavity or a recess 28. The location of this recess 28 is such that it corresponds to a location directly in front of the bottom surface of the valve member 23 when the input shaft 2 has been turned to a predetermined position, preferably an end position of the steering wheel deviation. The rack 4 also comprises a further (not shown) recess which is placed in a position which corresponds to the input shaft 2 being turned to its second end position.

Figure 3:
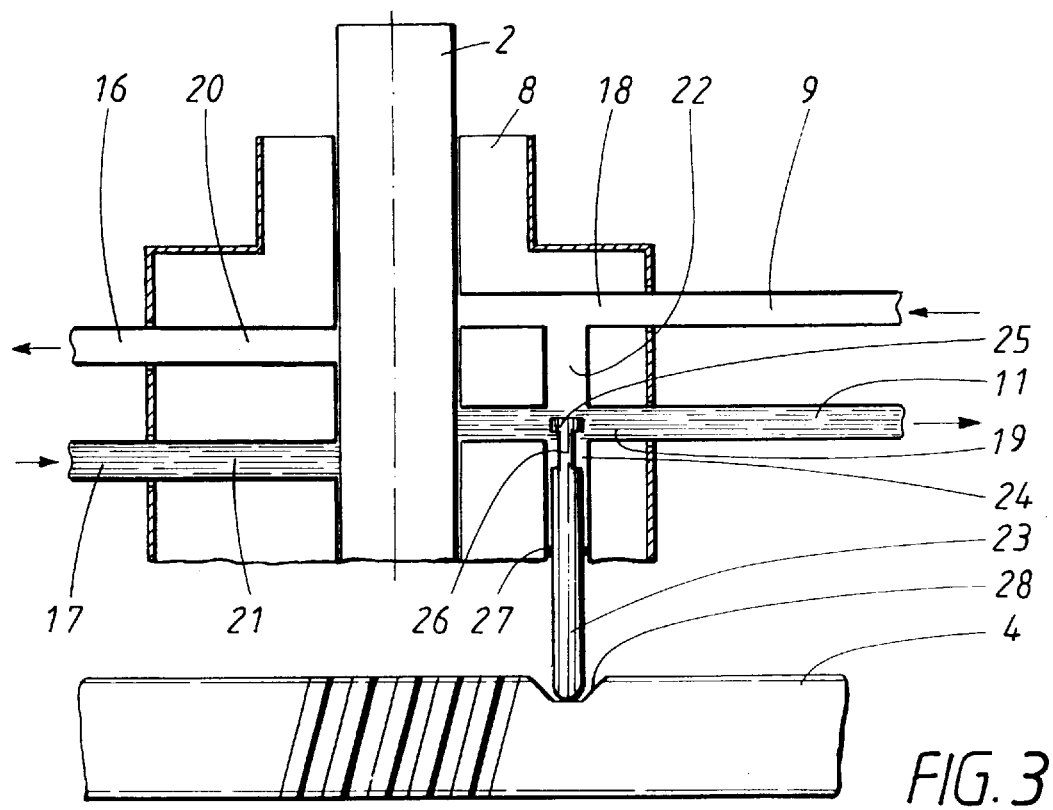
FIG. 3 shows the device according to FIG. 2 in a second position.

When the input shaft 2 has been turned to an end position, the valve member 23 will be directly in front of the recess 28. Because of the high servo pressure in the supply channel 18 and because of the weight of the valve member 23 itself, the valve member 23 will be pressed into the recess 28, i.e. it is displaced downwards into the connection channel 22 and the channel section 24. This condition is shown in FIG. 3. Since the valve member 23 is brought down into the recess 28, the upper portion 25 will be pressed downwards a distance through the connection channel 22. According to what is shown in FIG. 3, this entails that a connection between the supply channel 18 and the return channel 19 is uncovered, which in turn implies that the supply line 9 and the return line 11 are short-circuited. This implies that the servo pressure decreases. In this way, the pressure with which the servo mechanism acts on the steering gear 1 is reduced.

When the input shaft 2 is once more turned away from the end position of the rack 2, the valve member 23 will be pressed up from the recess 28. This is facilitated since the recess 28 comprises oblique edges against which the bottom surface of the valve member 23 can slide.

Figure 4:
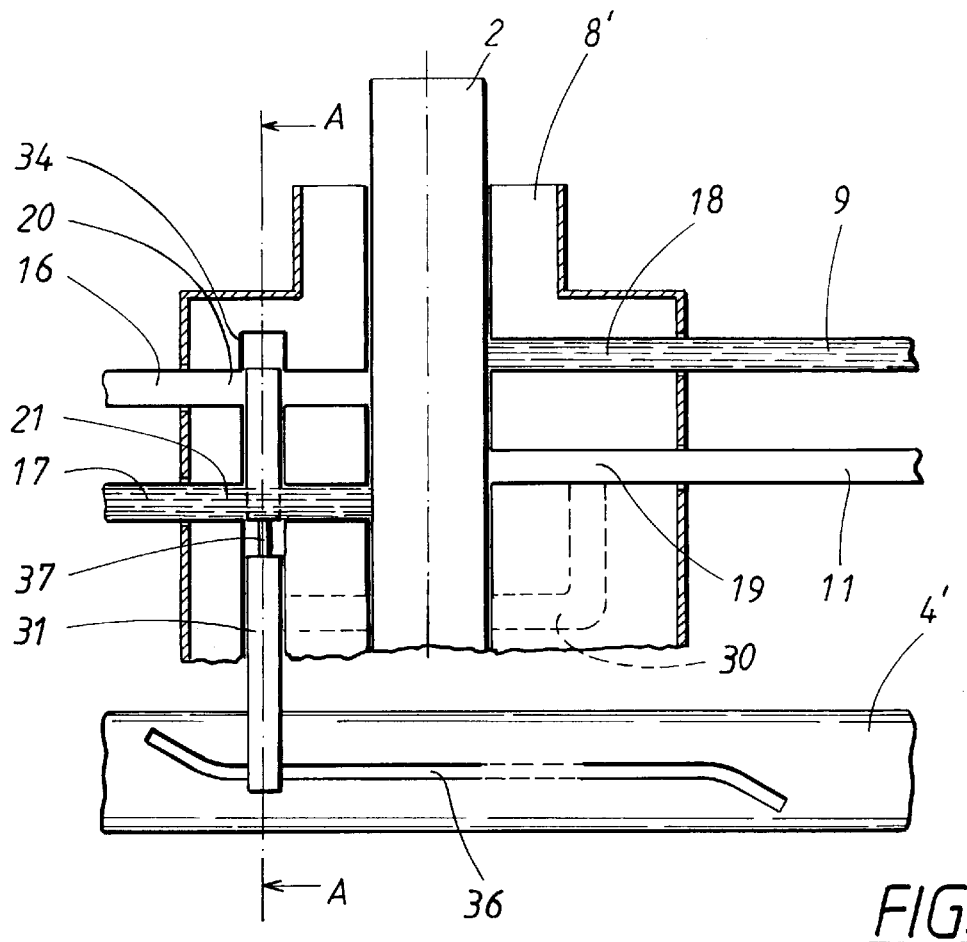
FIG. 4 is a partially cut away view of a second embodiment of the steering gear device according to the invention.

In FIG. 4 there is shown a partially cut away, principal view of a valve box 8' according to an alternative embodiment of the invention. The drawing also shows a part of an input shaft 2 and a rack 4', and represents the invention in a condition which corresponds to the steering wheel being influenced to be turned clockwise, i.e. in order to steer the vehicle to the right direction. In this manner, servo oil is fed through the supply line 9 to the supply channel 18 in the valve box 8'.

With the help of the above mentioned valve baffle in the valve box 8', the oil is directed to the fourth line 17 via the fourth channel 21 in the valve box 8'. In this way, the servo oil is fed further on to the second chamber 14 (compare with FIG. 1) in the cylinder 12. In FIG. 4, servo oil under high pressure has been marked with hatched lines. Furthermore, the servo oil from the cylinder 12 (compare with FIG. 1) is returned via the third line 16 and the third channel 20 in the valve box 8' and thereafter back to the return channel 19. In this way, a power addition is obtained which influences the rack 4 in the desired direction.

Figure 5:
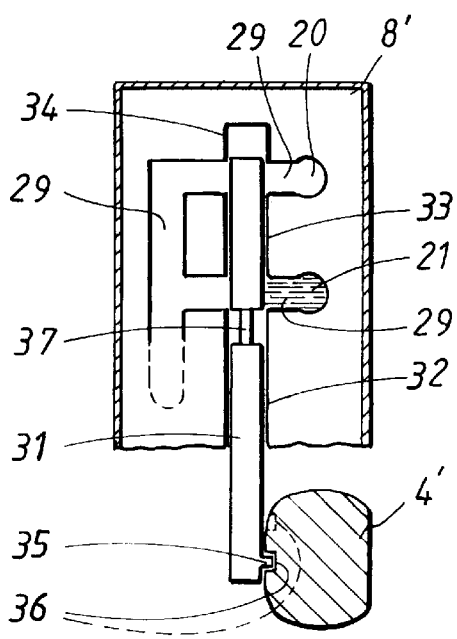
FIG. 5 is a sectional view along line A—A in FIG. 4, in a first operation condition.

In FIG. 5, a cross-sectional view along the line A—A in FIG. 4 is shown. From this drawing it is evident that the third channel 20 and the fourth channel 21 are arranged so that they communicate with a further channel 29. Furthermore, with reference to FIGS. 4 and 5, it is evident that said further channel 29 in its turn is connected to the return channel 19 via a special connection channel 30 which is arranged in the valve box 8'. The object of the connection channel 30 is to connect either the third channel 20 or the fourth channel 21 to the return line 11 (via the return channel 19) when the rack is in one of its end positions. In this way, the servo effect may be interrupted for continued turning of the steering column in a direction towards the end position in question, while the servo effect can still be obtained when turning the rack away from the end position in question.

Furthermore, a valve member 31 in the form of an essentially cylindrical rod is arranged inside the valve box 8'. As in the above mentioned embodiment, the valve member 31 may be displaced inside the valve box 8', in the main at right angles to the rack 4'. For this purpose, the valve box 8' is designed with further channel sections 32, 33 and 34, along which the valve member 31 may be displaced. Furthermore, the valve member 31 is arranged with a lower, protruding portion 35 which interacts with a corresponding groove 36 in the rack 4'. The groove 32 is curved upwards and downwards, respectively, in its end-portions, which entails that the valve member 31 may be influenced upwards or downwards when the rack 4' has been displaced into a position which corresponds to an end position of the steering wheel.

The valve member 31 may also be provided with (not shown) sealings which prevent leakage of servo oil along the channel sections 32, 33 and 34. Furthermore, the valve member 31, when in the condition shown in FIGS. 4 and 5, is dimensioned so that it prevents servo oil from leaking out from the third channel 20 and the fourth channel 21, respectively, to said further channel 29 which is connected to the return channel 19.

Figure 6:
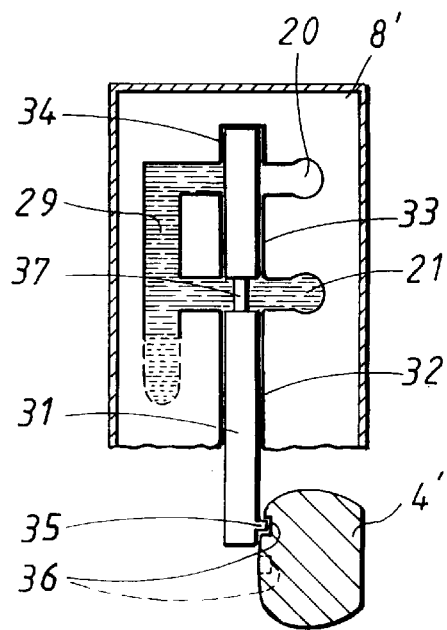
FIG. 6 is a sectional view along line A—A in FIG. 4, in a second operation condition.

In FIG. 6, the device according to the embodiment is shown in an end position. More exactly, the drawing shows the condition which is present when the rack 4' has been displaced as far as possible to the right (compare with FIG. 4). This implies that the valve member 31 has been raised a distance upwards because of the upwardly curved form of the groove 36. Furthermore, from FIG. 6 it is evident that the valve member 31 is designed with a narrow middle portion 37 which, in this condition, permits the passage of servo oil from the fourth channel 21 to the channel 29, and thus also further to the return channel 19. When the rack 4' is in its end position, the servo oil which is fed in is connected to the return line 11, which implies that the supply to the cylinder 12 (compare with FIG. 1) ceases and any servo effect in this direction can no longer be obtained. There again, there is no corresponding connection between the third channel 20 and the channel 29, which makes it possible to still achieve a servo effect if the shaft 2 is instead influenced by a torque in order to displace the rack 4' in a direction towards the opposite end position.

The invention is not limited to the embodiments described above, but may be varied within the scope of the subsequent claims. For instance, the valve member 23 (compare with FIGS. 2 and 3) may be spring-loaded so that it is more easily pressed down into the recess 28 when an end position has been reached.

The valve member 23 may be designed so that the servo pressure is reduced, either completely or partly (i.e. down to a certain predetermined level) when the rack 4 reaches its end position.

The shape modification may be arranged in positions which correspond to an end position of the rack, and in further positions along the rack 4 where reduced servo pressure is desired. Furthermore, the shape modification of the rack 4 may be designed in many different ways. It may for instance be constituted by a tapering shape of the rack 4. It may also be constituted by a protruding portion which influences the valve member 23 in a direction away from the rack 4, i.e. so that the valve member 23 is pressed upwards.

Furthermore, the upper portion 25 of the valve member 23 may comprise a separate seal in order to block the connection channel 22 in the functional condition shown in FIG. 2. The upper portion 25 may further be designed in different ways, e.g. cylindrically or conically.

The surface of the valve member 23 abutting against the rack 4 may be provided with a particularly low friction coating or alternatively be provided with a roller or the like, so that the valve member 23 slides easily when the rack 4 is displaced.

Furthermore, the shape modification, which is constituted by a groove 36 interacting with a protruding portion of the valve member 31 (compare with FIGS. 4–6), may be utilized in connection with the embodiment according to FIGS. 2 and 3. A shape modification in the form of a recess and a protuberance (compare with FIGS. 2 and 3) may also be utilized in the embodiment which is shown in FIGS. 4–6.

According to a further embodiment, one valve per end position may be utilized instead of a single valve which is activated in both end positions. In this case, they may e.g. interact with a respective groove or a similar shape modification (corresponding to the respective end position) in the rack.

Finally, it is to be noted that the described valves may be arranged either in a valve box 8, 8' or in separate lines or boxes which are not in integrated in connection with the valve box 8, 8'.

I claim:

1. Steering apparatus for a vehicle comprising an input shaft, a rack connected to said input shaft, said rack being longitudinally displaceable in response to said input shaft, a servo mechanism utilizing a servo medium for supplying power to said rack, said servo mechanism including a box including a first channel for feeding said servo medium to said rack, a second channel for return of said servo medium from said rack and a connecting channel between said first and second channels, detecting means comprising a portion of said rack having a predetermined configuration disposed at a predetermined position with respect to said rack, and at least one valve member for opening said connecting channel by interacting with said portion of said rack having said predetermined configuration.

2. The steering apparatus of claim 1 wherein said at least one valve member comprises a substantially cylindrical rod.

3. The steering apparatus of claim 1 wherein said at least one valve member includes an upper portion adapted to block said connecting channel when said at least one valve member is not interacting with said portion of said rack having said predetermined configuration, and a predetermined narrow portion located at said second channel when said at least one valve member is not interacting with said portion of said rack having said predetermined configuration.

4. The steering apparatus of claim 3 wherein said upper portion of said at least one valve member comprises a seal.

5. The steering apparatus of claim 1 wherein said predetermined position of said detecting means corresponds to a predetermined position for said input shaft.

6. The steering apparatus of claim 1 wherein said predetermined configuration comprises a recessed portion of said rack.

7. The steering apparatus of claim 1 wherein said at least one valve member includes a surface for interacting with said portion of said rack having said predetermined configuration, said surface comprising a low friction surface.

8. The steering apparatus of claim 1 wherein said box includes a third channel aligned with said connecting channel, whereby said at least one valve member is also disposed within said third channel.

9. The steering apparatus of claim 1 wherein said first channel includes a first channel inlet portion for said servo medium, a first channel first supply portion for supplying said servo medium to said rack when said rack is displaced in a first direction and a first channel second supply portion for supply of said servo medium to said rack when said rack is displaced in a second direction, whereby said at least one valve member is adapted to connect said connecting channel to one of said first channel first supply portion and said first channel second supply portion when said at least one valve member is interacting with said portion of said rack having said predetermined configuration.

10. The steering apparatus of claim 1 wherein said predetermined configuration comprises a longitudinal groove in said rack, and wherein said at least one valve member includes a protruding portion adapted for interaction with said longitudinal groove.

11. The steering apparatus of claim 10 wherein said rack includes a side portion, and wherein said longitudinal groove is disposed along said side portion of said rack, said longitudinal groove including an upward turned portion and a downward turned portion, said upward turned portion and said downward turned portions defining said predetermined positions with respect to said rack.

* * * * *

UNITED STATES PATENT AND TRADEMARK OFFICE
CERTIFICATE OF CORRECTION

| | |
|---|---|
| PATENT NO. | : 6,085,633 |
| DATED | : July 11, 2000 |
| INVENTOR(S) | : Lars Markström |

It is certified that error appears in the above-identified patent and that said Letters Patent is hereby corrected as shown below:

Delete the specification and substitute the attached specification.
Delete the abstract and substitute the attached abstract.

Signed and Sealed this

Twenty fifth Day of September, 2001

Attest:

*Attesting Officer*

NICHOLAS P. GODICI
*Acting Director of the United States Patent and Trademark Office*

STEERING GEAR DEVICE

FIELD OF THE INVENTION

The present invention relates to a device for the reduction of servo pressure in a steering gear.

BACKGROUND OF THE INVENTION

In connection with steering mechanisms for motor vehicles, servo mechanisms are often utilized in order to supply power to the steering mechanism when turning the steering wheel of the vehicle. A commonly occurring steering gear comprises an input shaft on which the steering wheel is arranged, whereby the shaft transfers the movements of the steering wheel to a pinion which in turn is connected to a rack. The movements of the rack are in turn transferred to the wheels of the vehicle. Such a known steering gear may be complemented by a servo mechanism which comprises a hydraulic cylinder with a piston which is arranged on the rack. The servo mechanism also comprises a servo pump and a valve assembly. When turning the steering wheel of the vehicle, hydraulic oil is fed to the cylinder by means of the valve assembly, whereby the piston and consequently also the rack is influenced in a direction corresponding to the turning direction of the steering wheel. In this manner, power is supplied to the rack when turning the steering wheel.

In these previously known devices, the flow of hydraulic oil from the servo pump to the steering gear is always constant. When the servo function comes into force, the servo pressure increases since the flow through the steering gear is throttled by means of the above-mentioned valve assembly. This is particularly disadvantageous when the steering gear reaches one of its end positions, e.g. when the steering wheel is turned to the left or the right end position, and in that condition causes problems in the form of noise and vibrations. Furthermore, the engine of the vehicle is heavily loaded by the servo pump, which means that the idling speed of

-1- the vehicle cannot always be kept constant. Finally, the hydraulic oil is heated up at an abnormal rate, which may cause damage to the servo pump.

A previously known device which aims at solving these problems is shown in U.S. Patent No. 4,354,422. The device comprises a pivoting cage which may be turned in relation to an input shaft which is connected to the steering wheel of the vehicle. The cage is connected to a valve which can be adjusted so that oil is supplied for the displacement of a rack when the input shaft is turned. When the rack reaches one of its end positions, the cage will be influenced by a cam member and will be turned back to a neutral position, independent of the force on the input shaft. This means that the valve returns to a neutral position so that a connection between an oil supply line and an oil tank is short-circuited. In this way, the power from the servo pump is reduced.

The construction of this previously known device is, however, rather complicated, which results in high manufacturing costs and may also cause problems. Furthermore, it cannot be utilized in connection with all types of conventional steering gears.

SUMMARY OF THE INVENTION

A main object of the present invention is to solve the above-mentioned problems and to provide an improved device which reduces the load derived from a servo mechanism of a steering gear when the steering wheel has been turned to a predetermined position and which may be utilized in connection with conventional steering gear.

In accordance with the present invention, this and other objects have now been accomplished by the invention of a steering apparatus for a vehicle comprising an input shaft, a rack connected to the input shaft, the rack being longitudinally displaceable in response to the input shaft, a servo mechanism utilizing a servo medium for supplying power to the rack, the servo mechanism

-2- including a box including a first channel for feeding the servo medium to the rack, a second channel for return of the servo medium from the rack and a connecting channel between the first and second channels, detecting means comprising a portion of the rack having a predetermined configuration disposed at a predetermined position with respect to the rack, and at least one valve member for opening the connecting channel by interacting with the portion of the rack having the predetermined configuration.

In a preferred embodiment, the at least one valve member comprises a substantially cylindrical rod.

In accordance with one embodiment of the steering apparatus of the present invention, the at least one valve member includes an upper portion adapted to block the connecting channel when the at least one valve member is not interacting with the portion of the rack having the predetermined configuration, and a predetermined narrow portion located at the second channel when the at least one valve member is not interacting with the portion of the rack having the predetermined configuration. In a preferred embodiment, the upper portion of the at least one valve member comprises a seal.

In accordance with another embodiment of the steering apparatus of the present invention, the predetermined position of the detecting means corresponds to a predetermined position for the input shaft.

In accordance with another embodiment of the steering apparatus of the present invention, the predetermined configuration comprises a recessed portion of the rack.

In accordance with another embodiment of the steering apparatus of the present invention, the at least one valve member includes a surface for interacting with the portion of the rack having the predetermined

-3- configuration, the surface comprising a low friction surface.

In accordance with another embodiment of the steering apparatus of the present invention, the box includes a third channel aligned with the connecting channel, whereby the at least one valve member is also disposed within the third channel.

In accordance with another embodiment of the steering apparatus of the present invention, the first channel includes a first channel inlet portion for the servo medium, a first channel first supply portion for supplying the servo medium to the rack when the rack is displaced in a first direction and a first channel second supply portion for supply of the servo medium to the rack when the rack is displaced in a second direction, whereby the at least one valve member is adapted to connect the connecting channel to one of the first channel first supply portion and the first channel second supply portion when the at least one valve member is interacting with the portion of the rack having the predetermined configuration.

In accordance with another embodiment of the steering apparatus of the present invention, the predetermined configuration comprises a longitudinal groove in the rack, and wherein the at least one valve member includes a protruding portion adapted for interaction with the longitudinal groove. In a preferred embodiment, the rack includes a side portion, and the longitudinal groove is disposed along the side portion of the rack, the longitudinal groove including an upward turned portion and a downward turned portion, the upward turned portion and the downward turned portions defining the predetermined positions with respect to the rack.

Accordingly, the present invention comprises a valve member, abutting directly against the rack and extending through a connecting channel between the supply and return lines for servo oil medium, and the rack is provided with a portion having a modified shape for interaction with the valve member, whereby the valve member in an effective way may be displaced so that the supply and the return lines are short-circuited when the rack is in a predetermined position. In this manner, a simple but effective valve construction is obtained which, moreover, may be integrated into a conventional servo system.

According to a preferred embodiment of the present invention, the valve member is made up of an essentially cylindrical rod or pin which slides with its bottom surface against the rack.

Preferably, the present invention comprises a supply channel for servo-medium when the rack is displaced in one direction, and a further supply channel for servo-medium when the rack is displaced in the opposite direction. According to a particular embodiment, the above-mentioned valve member is arranged to connect one of said supply channels with a return line for servo-oil, via a connection channel, when detecting said predetermined position of the rack.

DESCRIPTION OF THE DRAWINGS

The invention will be described in the following Detailed Description with reference to the attached drawings, in which Fig. 1 is a side, elevational, schematic view of a steering gear according to the present invention, Fig. 2 is a top, elevational, enlarged, partially cut away, schematic view showing the device according to the present invention in a first position;

Fig. 3 is a top, enlarged, partially cut away, schematic view of the device according to Fig. 2, in a second position;

Fig. 4 is a top, elevational, enlarged, partially cut away schematic view of a second embodiment of the steering gear device according to the present invention;

Fig. 5 is a side, elevational, sectional view taken along line A-A in Fig. 4, in a first operational condition; and Fig. 6 is a side, elevational, sectional view taken along line A-A in Fig. 4, in a second operational condition.

DETAILED DESCRIPTION OF THE PREFERRED EMBODIMENTS

In Fig. 1, a device according to the present invention is shown in a schematic and somewhat simplified form. According to a preferred embodiment, the device is intended to be used in connection with steering gear 1 of an essentially conventional type, intended for use in a motor vehicle.

The steering gear 1 is of a rack type and comprises an input shaft 2 which is connected to a (not shown) steering wheel of the vehicle. The input shaft 2 is firmly attached to a pinion 3, which comprises teeth interacting with corresponding teeth on a rack 4. Two steering drag rods, 5 and 6, are arranged on the respective ends of the rack 4. The steering drag rods, 5 and 6, are fitted in a conventional manner to the rack 4 by meeans of ball joints or the like and are intended to control the direction of the wheels. In this manner, a torsional movement of the steering wheel may be transferred to the wheels of the vehicle through the input shaft 2, the pinion 3, the rack 4 and the steering drag rods, 5 and 6. The deflection of the wheels, i.e. the end positions of the steering wheel and the input shaft 2, are defined by (not shown) stops in the steering gear 1.

The rack 4 is built into a steering box 7 which in turn is incorporated within a valve box 8, the construction and function of which will be described in detail below. A supply line 9 for the supply of a servo medium, preferably oil, from a servo pump 10 is connected to the valve box 8. Furthermore, a return line 11 is provided which is connected between the valve box 8 and the servo pump 10 and which is intended for returning servo oil from the steering gear 1 to the servo pump 10. The servo pump 10 is preferably driven by means of a (not shown) mechanical transmission from the engine of the vehicle, e.g. a V-belt.

Furthermore, the device comprises a hydraulic cylinder 12 which is formed between the rack 4 and the steering box 7. The cylinder 12 is divided into a first cylinder chamber 13 and a second cylinder chamber 14 by means of a piston 15 which is firmly mounted on the rack 4 and which seals against the inner walls of the cylinder 12 (i.e. the steering box 7). Furthermore, the valve box 8 is connected to the cylinder chambers, 13 and 14, by means of a third line 16 and a fourth line 17.

When operating the device, the servo pump 10 is driven by the engine of the vehicle. In this manner, servo oil is fed from the servo pump 10 to the steering box 1 through the supply line 9. Within the valve box 8, in connection with the input shaft 2, there is located a valve baffle of a known type which is described in no greater detail. By means of this, servo oil at a high pressure may be directed to one of the cylinder chambers, 13 and 14, respectively, through the third or fourth line 16 and 17, respectively, depending on in which direction the input shaft 2 is displaced with a certain torque. Depending on the torsional position of the input shaft 2, the valve baffle is adapted to be able to connect the supply line 9, the return line 11, the third line 16 and the fourth line 17 to each other so that the following functions can be achieved:

i) If the input shaft 2 is located in a neutral position (i.e. if it has not been turned in any direction), the supply line 9 is short-circuited by the return line 11.

ii) If the input shaft 2 is turned counterclockwise (as seen from above), the supply line 9 is connected to the third line 16. Servo oil under high pressure is thereby fed to the first chamber 13. Consequently, the rack 4 is influenced to the left in Fig. 1. Furthermore, the fourth line 17 will come into contact with the return line 11 so that servo oil at a low

-8- pressure is fed from the second chamber 14 back to the servo pump 10.

iii) If the input shaft 2 is turned clockwise, the supply line 9 is connected to the fourth line 17. Servo oil under high pressure is thereby fed to the second chamber 14 so that the rack 4 is influenced to the right in Fig. 1. Furthermore, the third line 16 will come into contact with the return line 11 so that servo oil at low pressure is fed from the first chamber 13 back to the servo pump 10.

The above course of events is facilitated by means of the fact that the input shaft 2 is preferably provided with a (not shown) torsion bar of a previously known type. The torsion bar is, in a known manner attached to the input shaft 2 and the pinion 3 and permits that servo effect (in accordance with the above-mentioned functions i), ii) and iii)) to be obtained as soon as a torque is applied to the input shaft 2 in one of the two directions. By means of the torsion bar, servo effect may thus be obtained even if the input shaft 2 is not turned.

In Fig. 2, a partially cut away, principal view of the valve box 8 is shown. The drawing also shows a part of the input shaft 2 and the rack 4, and reproduces the invention in a state corresponding to the steering wheel being turned counterclockwise, i.e. in order to steer the vehicle to the left.

In this manner, servo oil is fed through the supply line 9 into a supply channel 18 in the valve box 8. The servo oil is returned from the valve box 8 through the return line 11 through a return channel 19.

In the operational case in question, the servo oil is directed with the help of the above-mentioned valve baffle to the third line 16 by means of a third channel 20 in the valve box 8. The servo oil is returned from the cylinder 12 (compare with Fig. 1) by means of the fourth line 17 and a fourth channel 21 in the valve box 8, and

-9- thereafter back to the return channel 19. In this way, a power addition is obtained, which affects the rack 4. In Fig. 2, servo oil under high pressure has been marked with hatched lines.

The supply channel 18 is connected to the return channel 19 by means of a connection channel 22. Furthermore, a valve member 23 in the form of an essentially cylindrical rod is arranged in the connection channel 22 and in a further channel portion 24 in the valve box 8. The channel portion 24 may constitute an extension of the connection channel 22 so that the valve member 23 may be displaced through the two channels 22 and 24.

The valve member 23 is preferably arranged essentially vertically so that its bottom surface abuts on the upper side of the rack 4. Furthermore, the valve member 23 has an upper portion 25 with dimensions which are slightly less than the dimensions of the connection channel 22. This results in the upper portion 25 having a sealing function which in the operating condition in question prevents servo oil from leaking into the return channel 11. Moreover, the valve member 23 has a narrow middle portion 26 which permits the passage of servo oil through the return channel 19. The valve member 24 is preferably made of steel and has a rounded bottom surface which slides against the upper surface of the rack 4. In order to reduce the friction of the rack 4 against the valve member 23, the latter is preferably lubricated with grease. Furthermore, the valve member 23 is provided with a seal 27 by means of which the channel section 24 is sealed.

In accordance with the present invention, the rack 4 comprises a shape modification, such as for instance a cavity or a recess 28. The location of this recess 28 is such that it corresponds to a location directly in front of the bottom surface of the valve member 23 when the input shaft 2 has been turned to a predetermined position, preferably an end position of the steering wheel deviation. The rack 4 also comprises a further (not shown) recess which is placed in a position which corresponds to the input shaft 2 being turned to its second end position.

When the input shaft 2 has been turned to an end position, the valve member 23 will be directly in front of the recess 28. Because of the high servo pressure in the supply channel 18 and because of the weight of the valve member 23 itself, the valve member 23 will be pressed into the recess 28, i.e. it is displaced downwards into the connection channel 22 and the channel section 24. This condition is shown in Fig. 3. Since the valve member 23 is brought down into the recess 28, the upper portion 25 will be pressed downwards a distance through the connection channel 22. As is shown in Fig. 3, a connection is thus uncovered between the supply channel 18 and the return channel 19, which in turn means that the supply line 9 and the return line 11 are short-circuited. The servo pressure therefore decreases. In this way, the pressure with which the servo mechanism acts on the steering gear 1 is reduced.

When the input shaft 2 is once more turned away from the end position of the rack 2, the valve member 23 will be pressed up from the recess 28. This is facilitated by the fact that the recess 28 comprises oblique edges against which the bottom surface of the valve member 23 can slide.

In Fig. 4 there is shown a partially cut away, principal view of a valve box 8' according to an alternative embodiment of the present invention. The drawing also shows a part of an input shaft 2 and a rack 4', and represents the invention in a condition which corresponds to the steering wheel being influenced to be turned clockwise, i.e. in order to steer the vehicle to

-11- the right direction. In this manner, servo oil is fed through the supply line 9 to the supply channel 18 in the valve box 8'.

With the help of the above-mentioned valve baffle in the valve box 8', the oil is directed to the fourth line 17 through the fourth channel 21 in the valve box 8'. In this way, the servo oil is fed further on to the second chamber 14 (compare with Fig. 1) in the cylinder 12. In Fig. 4, servo oil under high pressure has been marked with hatched lines.

Furthermore, the servo oil from the cylinder 12 (compare with Fig. 1) is returned through the third line 16 and the third channel 20 in the valve box 8' and thereafter back to the return channel 19. In this way, a power addition is obtained which influences the rack 4 in the desired direction.

In Fig. 5, a cross-sectional view along the line A-A in Fig. 4 is shown. From this drawing, it is evident that the third channel 20 and the fourth channel 21 are arranged so that they communicate with a further channel 29. Furthermore, with reference to Figs. 4 and 5, it is evident that said further channel 29 in its turn is connected to the return channel 19 by means of a special connection channel 30 which is arranged in the valve box 8'. The object of the connection channel 30 is to connect either the third channel 20 or the fourth channel 21 to the return line 11 (via the return channel 19) when the rack is in one of its end positions. In this way, the servo effect may be interrupted for continued turning of the steering column in a direction towards the end position in question, while the servo effect can still be obtained when turning the rack away from the end position in question.

Furthermore, a valve member 31 in the form of an essentially cylindrical rod is arranged inside the valve box 8'. As in the above-mentioned embodiment, the valve

-12- member 31 may be displaced inside the valve box 8', in general at right angles to the rack 4'. For this purpose, the valve box 8' is designed with further channel sections 32, 33 and 34, along which the valve member 31 may be displaced. Furthermore, the valve member 31 is arranged with a lower, protruding portion 35 which interacts with a corresponding groove 36 in the rack 4'. The groove 32 is curved upwards and downwards, respectively, in its end portions, which means that the valve member 31 may be influenced upwards or downwards when the rack 4' has been displaced into a position which corresponds to an end position of the steering wheel.

The valve member 31 may also be provided with (not shown) sealings which prevent leakage of servo oil along the channel sections 32, 33 and 34. Furthermore, the valve member 31, when in the condition shown in Figs. 4 and 5, is dimensioned so that it prevents servo oil from leaking out from the third channel 20 and the fourth channel 21, respectively, to said further channel 29 which is connected to the return channel 19.

In Fig. 6, the device according to this embodiment is shown in an end position. More precisely, the drawing shows the condition which is present when the rack 4' has been displaced as far as possible to the right (compare with Fig. 4). This means that the valve member 31 has been raised a distance upwards because of the upwardly curved form of the groove 36. Furthermore, from Fig. 6 it is evident that the valve member 31 is designed with a narrow middle portion 37 which, in this condition, permits the passage of servo oil from the fourth channel 21 to the channel 29, and thus also further to the return channel 19. When the rack 4' is in its end position, the servo oil which is fed in is connected to the return line 11, such that the supply to the cylinder 12 (compare with Fig. 1) ceases and any servo effect in this direction can no longer be obtained. There

-13- again, there is no corresponding connection between the third channel 20 and the channel 29, which makes it possible to still achieve a servo effect if the shaft 2 is instead influenced by a torque in order to displace the rack 4' in a direction towards the opposite end position.

The present invention is not limited to the embodiments described above, but may be varied within the scope of the claims. For instance, the valve member 23 (compare with Figs. 2 and 3) may be spring-loaded so that it is more easily pressed down into the recess 28 when an end position has been reached.

The valve member 23 may be designed so that the servo pressure is reduced, either completely or partly (i.e. down to a certain predetermined level) when the rack 4 reaches its end position.

The shape modification may be arranged in positions which correspond to an end position of the rack, and in further positions along the rack 4 where reduced servo pressure is desired. Furthermore, the shape modification of the rack 4 may be designed in many different ways. It may for instance constitute a tapering shape of the rack 4. It may also constitute a protruding portion which influences the valve member 23 in a direction away from the rack 4, i.e. so that the valve member 23 is pressed upwards.

Furthermore, the upper portion 25 of the valve member 23 may comprise a separate seal in order to block the connection channel 22 in the functional condition shown in Fig. 2. The upper portion 25 may further be designed in different ways, e.g. cylindrically or conically.

The surface of the valve member 23 abutting against the rack 4 may be provided with a particularly low friction coating or alternatively be provided with a roller or the like, so that the valve member 23 slides easily when the rack 4 is displaced.

-14-

Furthermore, the shape modification, which constitutes a groove 36 interacting with a protruding portion of the valve member 31 (compare with Figs. 4-6), may be utilized in connection with the embodiment according to Figs. 2 and 3. A shape modification in the form of a recess and a protuberance (compare with Figs. 2 and 3) may also be utilized in the embodiment which is shown in Figs. 4-6.

According to a further embodiment, one valve per end position may be utilized instead of a single valve which is activated in both end positions. In this case, they may e.g. interact with a respective groove or a similar shape modification (corresponding to the respective end position) in the rack.

Finally, it is to be noted that the described valves may be arranged either in a valve box 8, 8' or in separate lines or boxes which are not integrated in connection with the valve box 8, 8'.

170665.DOC

ABSTRACT OF THE DISCLOSURE

Steering apparatus is disclosed for vehicles including an input shaft, a rack connected to the input shaft displaceable in response to the input shaft, a servo mechanism for supplying power to the rack, the servo mechanism including a box having a first channel for feeding a servo medium to the rack, a second channel for return of the servo medium from the rack, and a connecting channel between the first two channels, a detector comprising a portion of the rack having a predetermined configuration disposed at a predetermined position with respect to the rack, and at least one valve for opening the connecting channel by interacting with the portion of the rack having such a predetermined configuration.